June 5, 1928.  P. P. DEAN  1,672,603
VALVE
Filed Feb. 19, 1927
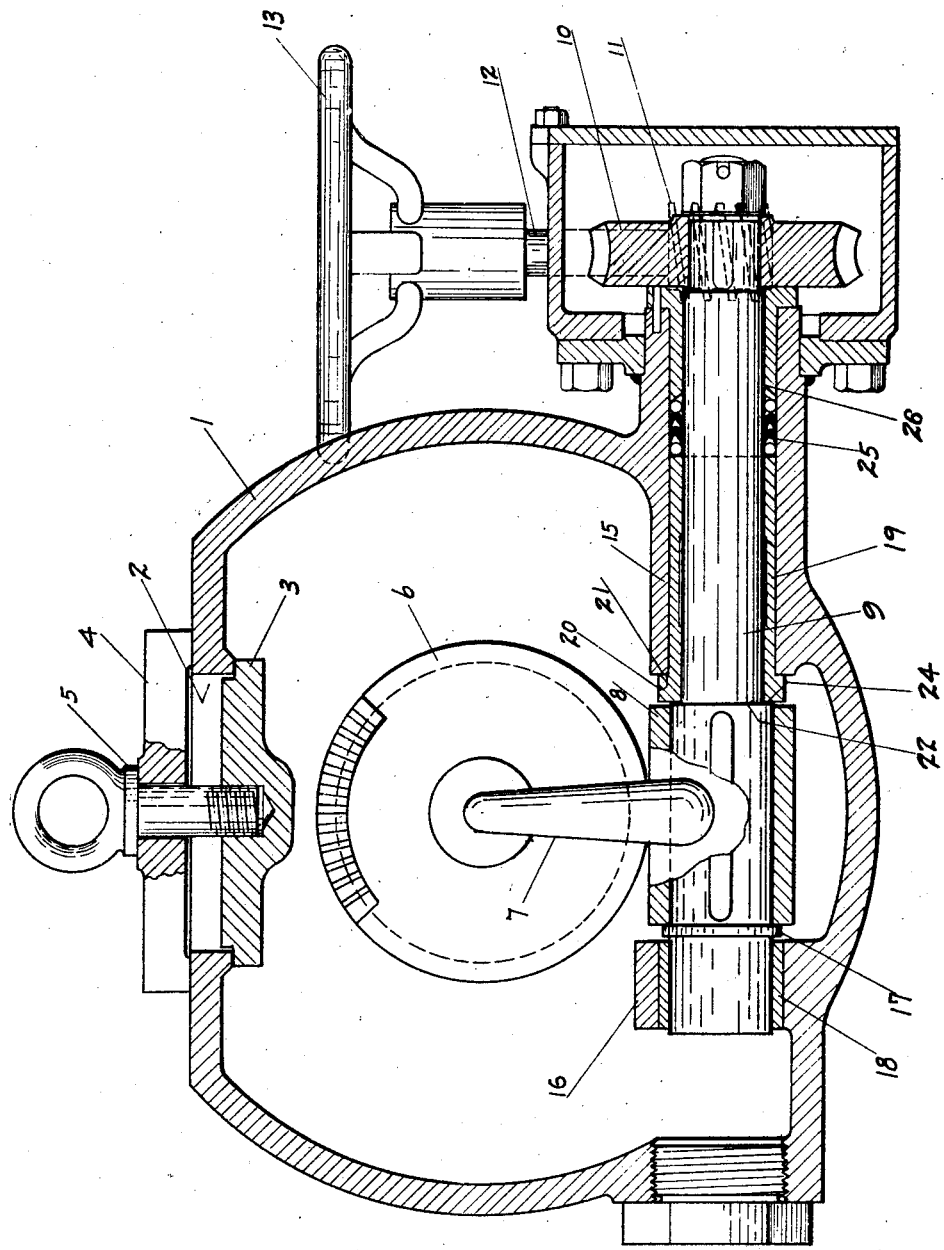
INVENTOR
Peter Payne Dean.
BY
ATTORNEY Patented June 5, 1928.

1,672,603

UNITED STATES PATENT OFFICE.

PETER PAYNE DEAN, OF NEW CANAAN, CONNECTICUT.

VALVE.

Application filed February 19, 1927. Serial No. 169,630.

The invention relates to valves for controlling the flow of fluids and especially adaptable to high pressure and high temperature conditions, and is concerned with that particular type of valve which embodies a swinging or pivoted disk member.

In my copending application for U. S. Letters Patent Ser. No. 153,484, filed December 9, 1926, I have disclosed a valve of this type and in which a disk is caused to be oscillated toward and away from a suitable valve seat to respectively close and open the valve, said disk being secured to and movable with a suitably mounted rock shaft. It is the object of the present invention to provide a simple and inexpensive construction of mounting for such rock shaft and in manner such that an adequate seal of the valve casing will be afforded thereby of the fluid controlled by said valve and solely by the existing pressure of the same—positively-acting mechanical sealing means embodying the customary packing and packing glands being unnecessary.

The nature of the invention, however, will best be understood when described in connection with the accompanying drawing, which is a transverse section through a valve equipped with the novel mounting and seal for the operating shaft controlling its disk.

Referring to the drawing, 1 designates a suitable casing providing the body of the valve which has an opening or handhole 2 at the top and normally closed by a cover member 3, the latter being held to the undersurface of the upper portion of the valve casing by means of a clamping bar 4 adapted to rest on the top of the valve casing and be clamped securely by an eye bolt 5 passing therethrough and threaded into the closure cover 3. The disk 6 of the valve is swingably mounted by means of an arm 7 secured to a hub 8 or sleeve member keyed to a rock shaft 9. The latter is rotatably mounted and supported in the casing and extends outwardly from the same, the projecting end thereof being provided with suitable mechanism for effecting the rotation or oscillation of said shaft to correspondingly swing the disk 6. Such mechanism may consist, for example, of a worm wheel 10 fixedly secured to the projecting end of the shaft and engaged by worm 11 mounted on a shaft 12 and rotatable by means of a hand wheel 13.

In accordance with the invention, said shaft 9 is to be so mounted in the casing that no leak of the fluid may occur about the shaft at the portion where said shaft leaves said valve casing. To this end, the shaft is mounted in a bearing 15 of the casing directed inwardly from its wall and is further supported in a bearing 16 provided in the interior of the casing substantially at the extreme inner end of the shaft. The said shaft at this point as well as at the hub portion is of somewhat enlarged diameter, as shown, an intermediate flange 17 being provided thereon as a stop for the hub 8.

An intermediate bushing 18 is provided in the bearing 16 as well as an intermediate bushing 19 in the bearing 15, the latter having an inner shoulder 20 accurately ground to abut the inner end face 21 of the bearing 15 which is also to be accurately ground in order that a ground joint may be secured at this point to securely seal the casing against escape of the fluid therein.

The shaft 9, as stated, is of larger diameter where it passes through the hub 8, than at the point where it passes through the bearing sleeve 15, providing thereby a shoulder 22. This shoulder 22, when properly ground, fits closely against the outer surface 24 of the sleeve bearing 19, so causing an effective seal between both surfaces.

It will be understood that the pressure of the fluid existing in said valve casing will be exerted against the inner end of the shaft 9 and will tend to force the shaft outwardly to thereby transmit the pressure to the surface 22 thereof which is forced under great pressure against the coacting surface 24, whereby the casing is sealed against the escape of fluid through the shaft bearings. This pressure also insures the seal at the ground joint between the shoulder 20 and surface 21.

In order to render doubly secure the seal, the bearing 15 may be counterbored at its outer end to admit of the insertion of suitable packing material 25 which is held in place by a gland 26 of fixed length, it being understood that in view of the peculiar sealing construction hereinbefore described, it will be unnecessary to provide a packing gland requiring adjustable mechanical pressure to be exerted thereby upon the packing material. This material may, therefore, be of a predetermined length and of the usual character as used for such purposes. As this auxiliary packing is not subjected to the full pressure of the fluid existing within the valve casing 1, as is the case with the ordinary type of sealing, said packing will last indefinitely. I have found that with the aforesaid construction it is possible to satisfactorily seal the valve casing at the shaft outlet even with prevailing pressures as high as 750 lbs. per square inch.

I claim:

1. In a valve comprising a casing, a valve disk, and a shaft extending into said casing for swinging said disk: means to secure said casing against escape of fluid about said shaft and including a bearing of the casing extending inwardly from its wall, a bushing about the shaft and located within said bearing, said bushing having an end flange abutting the inner end of the said bearing and forming therewith a ground joint seal and having its outer face ground, the said shaft having an intermediate enlarged portion affording a shoulder with ground surface engaging the ground face of the bushing to form a ground joint thereat, and a hub member connected with said valve disk and mounted upon said shaft to rotate therewith.

2. In a valve comprising a casing, a valve disk, and a shaft extending into said casing for swinging said disk: means to secure said casing against escape of fluid about said shaft and including a bearing of the casing extending inwardly from its wall, a bushing having an end flange abutting the inner end of the said bearing and forming therewith a ground joint seal and having its outer face ground, the said shaft having an intermediate enlarged portion affording a shoulder with ground surface engaging the ground face of the bushing to form a ground joint thereat, a hub member connected with said valve disk and mounted over the intermediate enlarged portion of said shaft to rotate therewith, and a flange at the far end of the intermediate enlarged portion to provide a stop for the said hub member.

3. In a valve comprising a casing, a valve disk, and a shaft extending into said casing for swinging said disk: means to secure said casing against escape of fluid about said shaft and including a bearing for the extreme inner end of the shaft and extending upwardly from the bottom of the casing, and a bearing of the casing extending inwardly from its wall, a bushing about the shaft and located within the last named bearing, said bushing having an end flange abutting the inner end of the said bearing and forming therewith a ground joint seal and having its outer face ground, the said shaft having an intermediate enlarged portion affording a shoulder with ground surface engaging the ground face of the bushing to form a ground joint thereat, and a hub member connected with said valve disk and mounted upon said shaft to rotate therewith.

4. In a valve comprising a casing, a valve disk, and a shaft extending into said casing for swinging said disk: means to secure said casing against escape of fluid about said shaft and including a bearing for the extreme inner end of the shaft and extending upwardly from the bottom of the casing, and a bearing of the casing extending inwardly from its wall, a bushing about the shaft and located within the last named bearing, said bushing having an end flange abutting the inner end of the said bearing and forming therewith a ground joint seal and having its outer face ground, the said shaft having an intermediate enlarged portion affording a shoulder with ground surface engaging the ground face of the bushing to form a ground joint thereat, a hub member connected with said valve disk and mounted over the intermediate enlarged portion of said shaft to rotate therewith, and a flange on the shaft between the first named bearing and said enlarged portion to provide a stop for the said hub member.

5. In a valve comprising a casing, a valve disk, and a shaft extending into said casing for swinging said disk: means to secure said casing against escape of fluid about said shaft and including a bearing of the casing extending inwardly from its wall, a bushing having an end flange abutting the inner end of the said bearing and forming therewith a ground joint seal and having its outer face ground, the said shaft having an intermediate enlarged portion affording a shoulder with ground surface engaging the ground face of the bushing to form a ground joint thereat, a hub member connected with said valve disk and mounted upon said shaft to rotate therewith, packing means of predetermined fixed length, and a packing gland of fixed length and cooperating therewith and inserted about the outer end of the shaft.

In testimony whereof I affix my signature.

PETER PAYNE DEAN.